United States Patent
Kaheel et al.

(10) Patent No.: US 10,509,963 B2
(45) Date of Patent: Dec. 17, 2019

(54) DISCOVERING AUTHORITATIVE IMAGES OF PEOPLE ENTITIES

(71) Applicant: MICROSOFT CORPORATION, Redmond, WA (US)

(72) Inventors: Ayman Malek Abdel Hamid Kaheel, Bellevue, WA (US); Padma Priya Gaggara, Redmond, WA (US); Prakash Asirvatham Arul, Redmond, WA (US); Mohammad Adil Hafeez, Redmond, WA (US); Dhananjay Dilip Kulkarni, Seattle, WA (US); Kancheng Cao, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1031 days.

(21) Appl. No.: 13/722,085

(22) Filed: Dec. 20, 2012

(65) Prior Publication Data

US 2014/0177966 A1 Jun. 26, 2014

(51) Int. Cl.
*G06K 9/00* (2006.01)
*G06F 16/951* (2019.01)
*G06F 16/9535* (2019.01)

(52) U.S. Cl.
CPC ....... *G06K 9/00677* (2013.01); *G06F 16/951* (2019.01); *G06F 16/9535* (2019.01)

(58) Field of Classification Search
CPC .. G06F 16/951; G06F 16/9535; G06F 17/278; G06F 16/334; G06F 16/248; G06F 16/3331; G06F 16/2455

USPC .......... 707/600–831, 899, 999.001–999.206
See application file for complete search history.

(56) References Cited

U.S. PATENT DOCUMENTS

| 7,515,773 | B2 | 4/2009 | Adachi et al. |
| 7,809,192 | B2 | 10/2010 | Gokturk et al. |
| 8,224,029 | B2 | 7/2012 | Saptharishi et al. |
| 8,788,477 | B1 * | 7/2014 | Jung ................. G06F 17/30899 707/706 |

(Continued)

OTHER PUBLICATIONS

"Search by Image", Retrieved on: Oct. 29, 2012, Available at: http://support.google.com/images/bin/answer.py?hl=en&answer=1325808.

(Continued)

*Primary Examiner* — Angelica Ruiz
(74) *Attorney, Agent, or Firm* — Shook, Hardy & Bacon, L.L.P.

(57) ABSTRACT

Systems, methods, and computer storage media for discovering authoritative images of people entities are provided. Selections of person entities are received. Authoritative URLs and authoritative images for the person entities are identified. Once the authoritative images are identified, features are extracted. Queries for the person entities are identified by mining search engine logs. The queries and features can be utilized to construct candidate queries to identify and retrieve candidate image URLs. Candidate features are extracted for each candidate image associated with the candidate image URLs. Training data may be utilized to train a classifier that can be run on each candidate image. Each candidate image can then be tagged with an entity ID tag. Images with the entity ID tag can be ranked higher in search engine results page than images without the entity ID tag.

20 Claims, 4 Drawing Sheets

(56) References Cited

U.S. PATENT DOCUMENTS

| | | | |
|---|---|---|---|
| 2010/0063961 A1 | 3/2010 | Guiheneuf et al. | |
| 2010/0205541 A1* | 8/2010 | Rapaport | G06Q 10/10 |
| | | | 715/753 |
| 2011/0072015 A1 | 3/2011 | Lin et al. | |
| 2011/0116690 A1* | 5/2011 | Ross | G06K 9/00295 |
| | | | 382/118 |
| 2012/0093375 A1* | 4/2012 | Yagnik | 382/118 |
| 2012/0114196 A1* | 5/2012 | Lee | 382/118 |
| 2012/0207349 A1 | 8/2012 | Murphy | |
| 2012/0314962 A1* | 12/2012 | Holland | G06F 17/30247 |
| | | | 382/218 |
| 2013/0121589 A1* | 5/2013 | Gokturk et al. | 382/195 |

OTHER PUBLICATIONS

"TinEye", Published on: Mar. 31, 2008, Available at: http://www.tineye.com/faq#how.

* cited by examiner

DISCOVERING AUTHORITATIVE IMAGES OF PEOPLE ENTITIES

BACKGROUND

In semantic web terminology, an entity is a set of structured attributes that uniquely identifies a person. Attributes of a typical person entity include name, user identification (id), date of birth, place of birth, occupation, and the source Uniform Resource Locator (URL) that was used to identify the entity. The current methods used to identify authoritative images of a person entity have many drawbacks.

One approach utilizes face recognition technologies, manually identifies a first image, and uses that image to recognize other images for the person entity. Unfortunately, this approach requires the image to be frontal and non-rotated. Many images do not meet these requirements. This approach is also difficult to scale because of the number of people and images in a search engine index.

Another approach utilizes traditional search engine ranking. Structure data associated with the entity is utilized to augment the query and retrieve images within documents that have keywords contained in the augmented query. However, this approach suffers from a number of issues. The document may contain multiple images and it is difficult to identify which image belongs to the person entity. Multiple people entities with the same name may cause the image to be associated with the wrong entity. In some instances, the name of the person entity is similar to the name of a non-person entity which may cause the non-person image to be associated with the person entity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, discovering authoritative images of people entities. In this regard, embodiments of the present invention identify authoritative images for a person entity. Features are extracted for the authoritative images. Search engine logs are mined to identify queries for the person entity. The queries and features are utilized to construct candidate queries for the person entity. The candidate queries are issues against a search engine image index to retrieve candidate image uniform resource locators (URLs). A classifier is trained with training data associated with the features and run on candidate images associated with the candidate image URLs. Each candidate image is tagged with an entity identification (ID) tag. The images with the entity ID tag are ranked higher in the search engine results page than images without the entity ID tag.

BRIEF DESCRIPTION OF THE DRAWINGS

The present invention is described in detail below with reference to the attached drawing figures, wherein.

DETAILED DESCRIPTION

Figure 1:
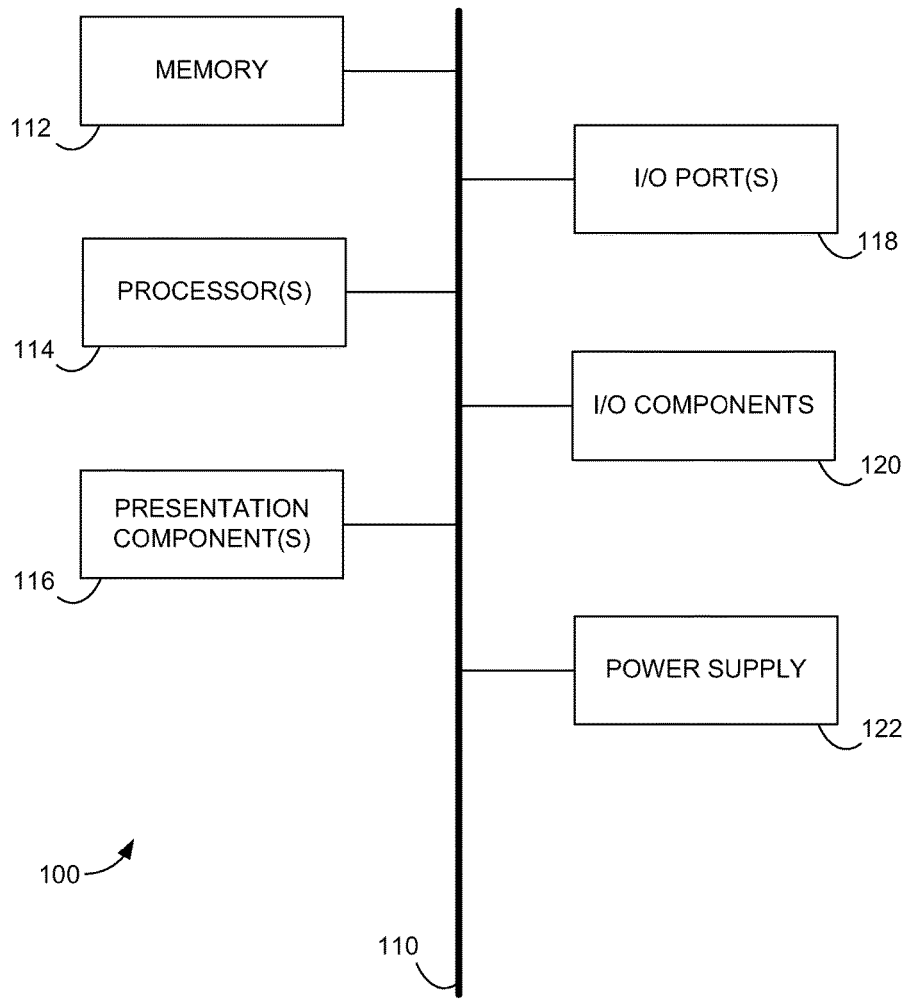
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, discovering authoritative images of people entities. A "person entity," in accordance with embodiments of the present invention, is a set of structured features that uniquely identifies a person. Features of a typical person entity include name, user identification (ID), date of birth, place of birth, occupation, and the source Uniform Resource Locator (URL) that was used to identify the entity.

Accordingly, one embodiment of the present invention is directed to one or more computer storage media having computer-executable instructions embodied thereon that, when executed by one or more computing devices, cause the one or more computing devices to perform a method of identifying and extracting features for authoritative images of people entities. The method includes receiving a selection of a person entity; extracting similar entities to the person entity; identifying authoritative uniform resource locators (URLs) for the person entity; identifying authoritative images for the person entity; and extracting features for the authoritative images.

In another embodiment, the present invention is directed to one or more computer storage media having computer-executable instructions embodied thereon that, when executed by one or more computing devices, cause the one or more computing devices to perform a method of identifying and ranking authoritative images of people entities. The method includes identifying authoritative images for a person entity; extracting features for the authoritative images; mining search engine logs to identify queries for the person entity; utilizing the queries and the features to construct candidate queries for the person entity; issuing the candidate queries against a search engine image index to retrieve candidate image URLs; training a classifier with training data associated with the features; running the classifier on candidate images associated with the candidate image URLs; tagging each candidate image with an entity identification (ID) tag; and ranking images with the entity ID tag higher in the search engine results page than images without the entity ID tag.

In yet embodiment, the present invention is directed to a computer system that facilitates discovering authoritative images of people entities. The computer system comprises a processor coupled to a computer storage medium, the computer storage medium having stored thereon a plurality of computer software components executable by the processor. The computer software components comprise a selection component that receives a selection of a person entity; an entity extraction component that extracts similar entities to the person entity; a uniform resource locator component that identifies authoritative uniform resource locators (URLs) for the person entity; an image component that identifies authoritative images for the person entity; an authoritative feature extraction component that extracts features for the authoritative images; a mine component that mines search engine logs to identify queries for the person entity; a construct component that utilizes the queries and the features to construct candidate queries for the person entity; an issue component that issues the candidate queries against a search engine image index to retrieve candidate image URLs; and a candidate feature extraction component that extracts candidate features for each candidate image from the candidate image URLs.

Having briefly described an overview of embodiments of the present invention, an n exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network.

In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

With continued reference to FIG. 1, computing device 100 includes a bus 110 that directly or indirectly couples the following elements: memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer storage media in the form of volatile and/or nonvolatile memory. The memory may be removable, non-removable, or a combination thereof. Exemplary hardware devices include solid state memory, hard drives, optical disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, etc.

Figure 2:
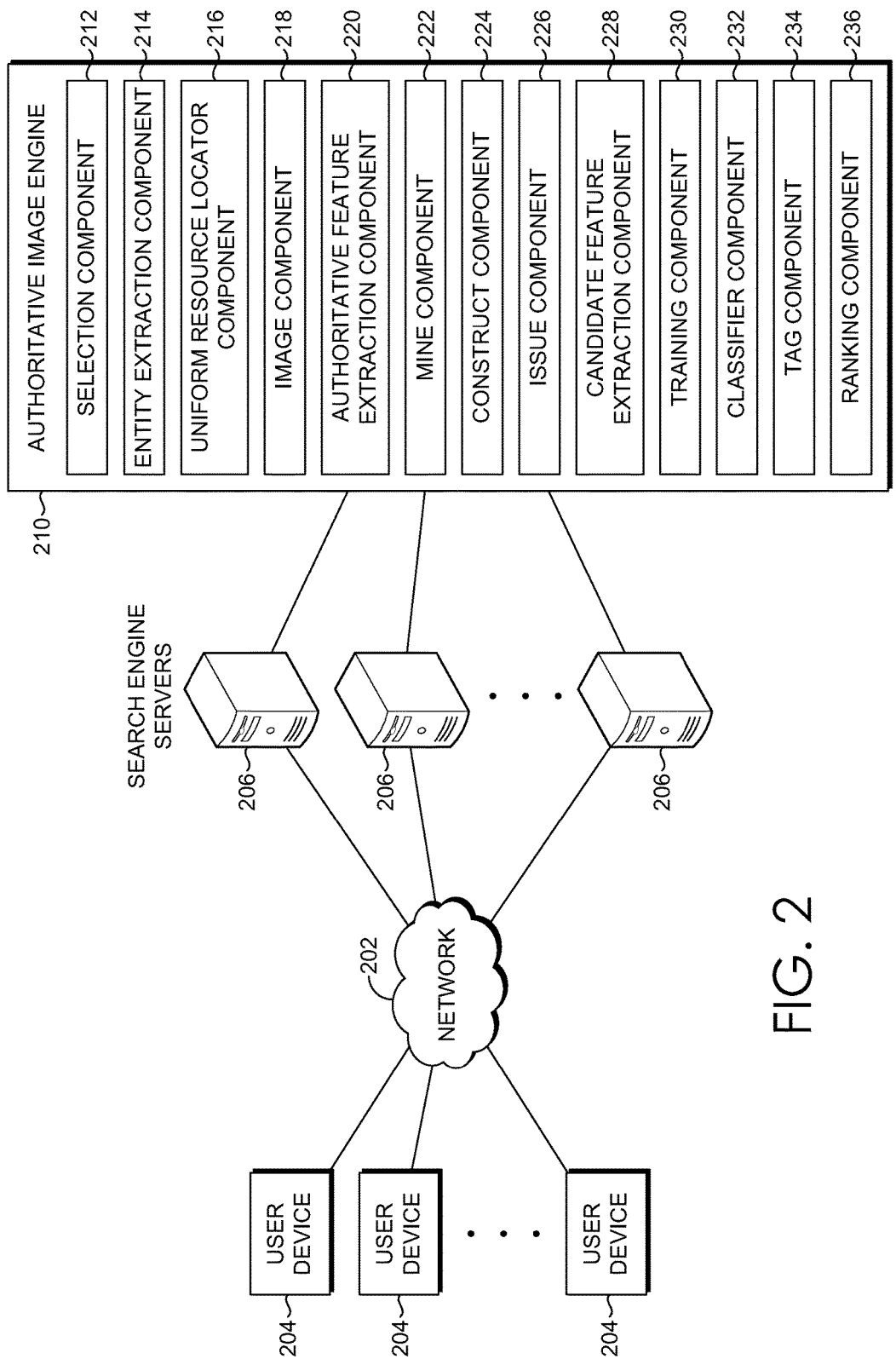
FIG. 2 schematically shows a network environment suitable for performing embodiments of the invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The computing system architecture 200 includes a network 202, one or more user devices 204, one or more search engine servers 206, and authoritative image engine 210. The network 202 includes any computer network such as, for example and not limitation, the Internet, an intranet, private and public local networks, and wireless data or telephone networks. The user device 204 is any computing device, such as the computing device 100, from which a search for an image can be initiated. For example, the user device 204 might be a personal computer, a laptop, a server computer, a wireless phone or device, a personal digital assistant (PDA), or a digital camera, among others. In an embodiment, a plurality of user devices 204, such as thousands or millions of user devices 204, is connected to the network 202. The search engine servers 206 and the authoritative image engine 210 are integrated, in one embodiment, in a single computing device. In another embodiment, the search engine servers 206 and authoritative image engine 210 may otherwise be in communication such that each server does not have to traverse the network 202 to communicate with one another.

The search engine server 206 includes any computing device, such as the computing device 100, and provides at least a portion of the functionalities for providing a search engine. In an embodiment a group of search engine servers 206 share or distribute the functionalities for providing search engine operations to a user population.

Authoritative image engine 210 includes any computing device, such as the computing device 100. In an embodiment a group of authoritative image engines 210 share or distribute the functionalities for, in various embodiments, identifying, extracting features for, and ranking authoritative images of people entities. Authoritative image engine 210 comprises selection component 212, entity extraction component 214, uniform resource locator (URL) component 216, image component 218, authoritative feature extraction component 220, mine component 222, construct component 226, issue component 228, and candidate feature extraction component 230. In various embodiments, authoritative image engine 210 comprises training component 230, classifier component 232, tag component 234, and ranking component 236.

Selection component 212 receives a selection of a person entity. In one embodiment, the selection is made from an entity store. The entity store (e.g., Satori) contains structured attributes of people entities. Attributes of a typical person entity include, in various embodiments, name, user identification (id), date of birth, place of birth, occupation, and the source Uniform Resource Locator (URL) that was used to identify the entity. These attributes can be used to help resolve situations where two or more people share the same or similar name or have a similar popularity. The attributes can also be used to help resolve situations where one person shares a name with a nonperson entity.

Once the selection has been received, entity extraction component 214 extracts similar entities to the person entity. For example, similar entities may share the same name as the selected entity. In one embodiment, similar entities include people entities within a configurable similarity distance using aliases from the entity store, speller suggestions, and Wikipedia redirects. In another embodiment, similar entities include and account for spelling mistakes or some differences in the spelling of the person entity. In one embodiment, a file with mappings between queries (i.e., names and/or aliases) and entity identifications (IDs) and/or display names is generated.

Uniform resource locator component 216 identifies authoritative URLs for the person entity. Authoritative URLs are high confidence and trustworthy URLs that can be used to identify reference images. For example, a Wikipedia page, an IMDB page, or an academics reference page about the person entity may be selected as an authoritative URL. The authoritative URL may be included, in one embodiment, in the mapping file described above. In another embodiment, the authoritative URL may be collected and assigned manually.

Image component 218 identifies authoritative images for the person entity. The authoritative images are selected from the authoritative URLs and utilized as reference images for the person entity. Authoritative feature extraction component 220 extracts features for the authoritative images. As described above, the features include, in various embodiments, text similarity features, click features, visual features, and absolute rank scores. Text similarity features refer to the text associated with a URL. Absolute rank scores indicate how good the result is for the query associated with a person. Visual features include, in one embodiment, face similarity features. In one embodiment, the features include how many times a particular candidate URL appears in different queries associated with an entity.

Mine component 222 mines search engine logs to identify queries for the person entity. In other words, mine component 222 identifies queries that were utilized to identify authoritative images. Once the queries are identified and the features are extracted, construct component 224 utilizes the queries and the features to construct candidate queries for the person entity. The candidate queries are utilized to identify candidate image URLs and associated candidate images.

Issue component 226 issues the candidate queries against a search engine image index to retrieve candidate image URLs and candidate images. For clarity, candidate images are images associated with web pages or documents identified by the candidate image URLs. Once candidate images are identified, candidate feature extraction component 228 extracts candidate features for each candidate image. As described above, the features include, in various embodiments, text similarity features, click features, visual features, and absolute rank scores. Text similarity features refer to the text associated with a URL. Absolute rank scores indicate how many times an image is responsive to a query associated with a person entity. Visual features include, in one embodiment, face similarity features.

In one embodiment, training component 230 trains a classifier with training data associated with the features and/or candidate features. Human judges can be presented with an image and a person entity and asked to label as a match or no match (i.e., by comparing features of the image to features that have been extracted from authoritative images). In embodiments, varying degrees of match may also be assigned as a label (e.g., partial match, twenty-five percent match, good match, excellent match, etc.). If no authoritative images are available, candidate images can be utilized to train the classifier. The classifier receives as input an image and a person entity and outputs a label. In embodiments, varying degrees of match may also be assigned as a label (e.g., partial match, twenty-five percent match, good match, excellent match, etc.).

After the classifier is trained, in one embodiment, classifier component 232 runs the classifier on each candidate image. When the classifier determines a match is made between an image and a person entity, in one embodiment, tag component 234 tags the image with an entity identification (ID) tag. For clarity, a match is determined by comparing the features associated with authoritative images to candidate features. The entity ID tag identifies the person entity associated with the image.

In one embodiment, ranking component 236 ranks images with the entity ID tag higher in the search engine results page than images without the entity ID tag. In other words, images that are associated with a person entity appear higher in the search results than images that are not associated with a person entity. This allows a person searching for a particular image to locate a desired image with higher confidence than would otherwise be possible without such ranking.

Figure 3:
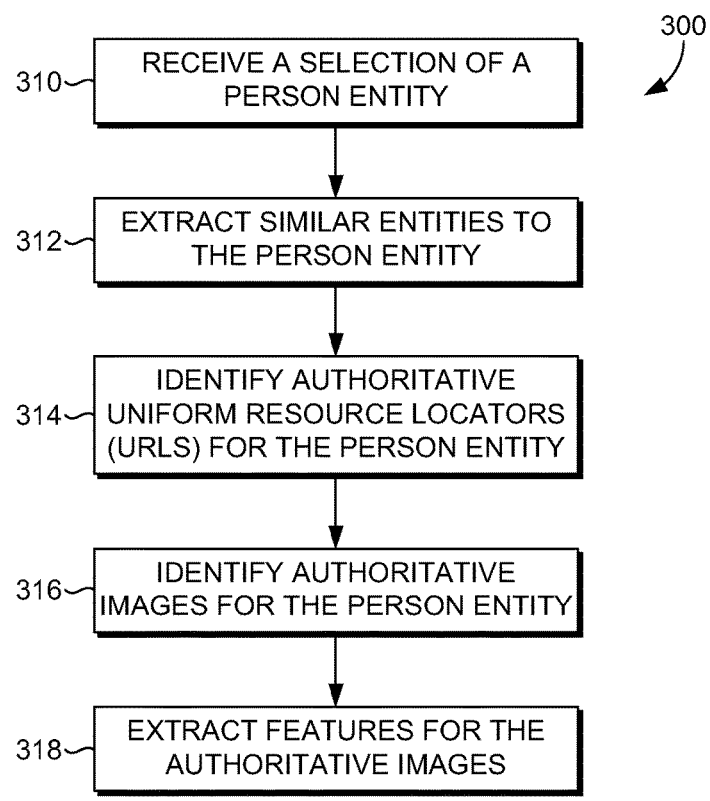
FIG. 3 is a flow diagram showing a method for identifying and extracting features for authoritative images of people entities, in accordance with an embodiment of the present invention.

Referring now to FIG. 3, a flow diagram illustrates a method of identifying and extracting features for authoritative images of people entities, in accordance with an embodiment of the present invention. At step 310, a selection of a person entity is received. In one embodiment, the selection is made from an entity store. The entity store (e.g., Satori) contains structured attributes of people entities. Attributes of a typical person entity include, in various embodiments, name, user identification (id), date of birth, place of birth, occupation, and the source Uniform Resource Locator (URL) that was used to identify the entity. These attributes can be used to help resolve situations where two or more people share the same or similar name or have a similar popularity. The attributes can also be used to help resolve situations where one person shares a name with a nonperson entity.

Similar entities to the person entity are extracted at step 312. For example, similar entities may share the same name as the selected entity. In one embodiment, similar entities include people entities within a configurable similarity distance using aliases from the entity store, speller suggestions, and Wikipedia redirects. In another embodiment, similar entities include and account for spelling mistakes or some differences in the spelling of the person entity. In one embodiment, a file with mappings between queries (i.e., names and/or aliases) and entity identifications (IDs) and/or display names is generated.

At step 314, authoritative uniform resource locators (URLs) for the person entity are identified. Authoritative URLs are high confidence and trustworthy URLs that can be used to identify reference images. In one embodiment, authoritative URLs include authoritative web pages that do not necessarily contain images and are used for text similarity features. In one embodiment, authoritative URLs include authoritative images, or reference images for computing image based similarity features. For example, a Wikipedia page, an IMDB page, or an academics reference page about the person entity may be selected as an authoritative URL. The authoritative URL may be included, in one embodiment, in the mapping file described above. In another embodiment, the authoritative URL may be collected and assigned manually.

Authoritative images for the person entity are identified at step 316. The authoritative images are selected from the authoritative URLs and utilized as reference images for the person entity. Features are extracted from the authoritative images at step 318. In various embodiments, the features include text similarity features, click features, visual features, and absolute rank scores. Text similarity features refer to the text associated with a URL. Absolute rank scores indicate how many times an image is responsive to a query associated with a person entity. Visual features include, in one embodiment, face similarity features.

In one embodiment, search engine logs are mined to identify queries for the person entity. In other words, query data is analyzed to identify queries that were utilized to identify authoritative images. Once the queries are identified, in one embodiment, the queries and the extracted features are utilized to construct candidate queries for the person entity. The candidate queries are utilized to identify candidate image URLs and associated candidate images. In one embodiment, the candidate queries are issued against an image index to retrieve candidate image URLs.

In one embodiment, candidate features are extracted for each candidate image associated with the candidate image URLs. The candidate feature include, in various embodiments, text similarity features, click features, visual features, and absolute rank scores. Text similarity features refer to the text associated with a URL. Absolute rank scores indicate how many times an image is responsive to a query associated with a person entity. Visual features include, in one embodiment, face similarity features.

In one embodiment, a classifier is trained with training data associated with the features and/or candidate features. Human judges can be presented with an image and a person entity and asked to label as a match or no match (i.e., by comparing features of the image to features that have been extracted from authoritative images). In embodiments, varying degrees of match may also be assigned as a label (e.g., partial match, twenty-five percent match, good match, excellent match, etc.). If no authoritative images are available, candidate images can be utilized to train the classifier. The classifier receives as input an image and a person entity and outputs a label. In embodiments, varying degrees of match may also be assigned as a label (e.g., partial match, twenty-five percent match, good match, excellent match, etc.).

In one embodiment, the classifier is run on an image index. When the classifier determines a match is made between an image and a person entity, in one embodiment, the image is tagged with an entity identification (ID) tag. The entity ID tag identifies the person entity associated with the image. In one embodiment, upon receiving an image search, images associated or tagged with an entity ID tag are ranked higher in the search engine results page than images not associated or not tagged with an entity ID tag. In other words, images associated with a person entity appear higher in the search results than images that are not associated with a person entity.

Figure 4:
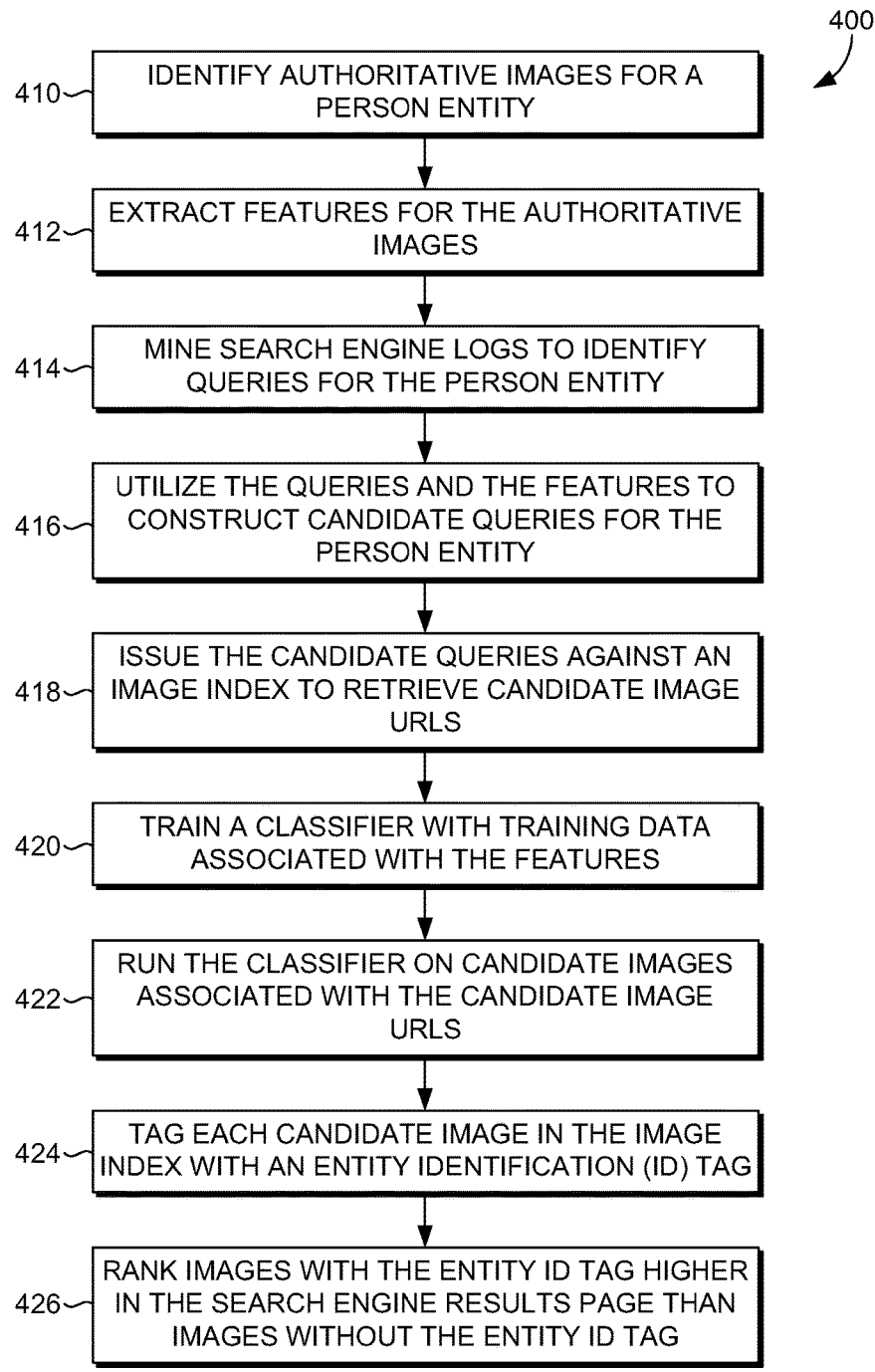
FIG. 4 is a flow diagram showing a method for identifying and ranking authoritative images of people entities, in accordance with an embodiment of the present invention.

Referring now to FIG. 4, a flow diagram illustrates a method of identifying and ranking authoritative images of people entities, in accordance with an embodiment of the present invention. At step 410, authoritative images and/or authoritative URLs for a person entity are identified. The authoritative images are associated with authoritative URLs such as a Wikipedia page, an IMDB page, or an academics reference page about the person entity. As can be appreciated, the source for an authoritative URL may be dependent on an occupation, celebrity status, location, and the like for the person entity.

At step 412, features are extracted from the authoritative images and/or authoritative URLs. The features include, in various embodiments, text similarity features, click features, visual features, and absolute rank scores. Text similarity features refer to the text associated with a URL. Absolute rank scores indicate how many times an image is responsive to a query associated with a person entity. Visual features include, in one embodiment, face similarity features.

Search engine logs are mined, at step 414, to identify queries for the person entity. This mining process identifies queries that were utilized to identify authoritative images. Utilizing the queries and the features, at step 416, candidate queries are constructed for the person entity. Candidate image URLs are retrieved, at step 418, by issuing the candidate queries, at step 418, against an image index. Candidate images are images associated with web pages or documents identified by the candidate image URLs. In one embodiment, once candidate images are identified, candidate features for each candidate image and/or candidate URL are extracted. The candidate features include, in various embodiments, text similarity features, click features, visual features, and absolute rank scores. Text similarity features refer to the text associated with a URL. Absolute rank scores indicate how many times an image is responsive to a query associated with a person entity. Visual features include, in one embodiment, face similarity features.

A classifier is trained, at step 420, with training data associated with the features. In various embodiments, the features include authoritative features, candidate features, or a combination thereof. In one embodiment, human judges are presented with an image and a person entity and asked to label as a match or no match (i.e., by comparing features of the image to features that have been extracted from authoritative images). In embodiments, varying degrees of match may also be assigned as a label (e.g., partial match, twenty-five percent match, good match, excellent match, etc.). If no authoritative images and/or authoritative URLs are available, candidate images and/or candidate URLs can be utilized to train the classifier. In one embodiment, the classifier receives as input a URL and/or image and a person entity and outputs a label. In embodiments, varying degrees of match may also be assigned as a label (e.g., partial match, twenty-five percent match, good match, excellent match, etc.).

At step 422, the classifier is run on an image index. When the classifier determines a match is made between an image and a person entity, in one embodiment, tag component 234 tags the image with an entity identification (ID) tag. The entity ID tag identifies the person entity associated with the image. Images that have been tagged with an entity ID are ranked higher, in one embodiment, than images that have not been tagged with an entity ID. In other words, images that have been associated with a person entity appear higher in the search results than images that have not yet been associated with a person entity. This allows a person searching for a particular image to locate a desired image with higher confidence than would otherwise be possible without such ranking.

It will be understood by those of ordinary skill in the art that the order of steps shown in the method 300 and 400 of FIGS. 3 and 4 respectively are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method of identifying authoritative images of people entities, the method comprising:
   receiving a selection of a person entity;
   identifying an authoritative image of the person entity;
   extracting a first set of one or more features from the authoritative image of the person entity;
   receiving, from search engine logs, queries used to search for the person entity;
   constructing a candidate query based on the first set of one or more features from the authoritative image of the person entity and on the queries used to search for the person entity;
   receiving a candidate image based on the candidate query being issued to a search engine image index;
   extracting a second set of one or more features from the candidate image of the person entity;
   determining a match based on comparing the first set of one or more features from the authoritative image of the person entity to the second set of one or more features from the candidate image of the person entity;
   based on determining the match exists, tagging the candidate image with an entity ID tag, wherein the candidate image tagged with the entity ID tag causes a ranking of the candidate image tagged with the entity ID tag to be ranked higher in one or more search results of the person entity than of an image without the entity ID tag.

2. The method of claim 1, wherein the identifying authoritative image of the person entity includes identifying URLs from Wikipedia, IMDB page, and/or an academic reference.

3. The method of claim 2, wherein extracting a first set of one or more features from the authoritative image of the person entity includes the extracting of text features, wherein the text features include text associated with URLs associated with the authoritative image.

4. The method of claim 3, wherein extracting a first set of one or more features from the authoritative image of the person entity includes the extracting of click features.

5. The method of claim 4, wherein extracting a first set of one or more features from the authoritative image of the person entity includes the extracting of visual features.

6. The method of claim 5, wherein extracting a first set of one or more features from the authoritative image of the person entity includes the extracting of text similarity features.

7. The method of claim 5, wherein extracting a first set of one or more features from the authoritative image of the person entity includes the extracting of absolute rank scores, wherein the absolute rank scores indicate how many times an image is responsive to a query associated with a person entity.

8. The method of claim 7, wherein extracting a first set of one or more features from the candidate image of the person entity includes the extracting of text features, wherein the text features includes text associated with URLs associated with the candidate image.

9. The method of claim 5, wherein extracting a first set of one or more features from the candidate image of the person entity includes the extracting of absolute rank scores, wherein the absolute rank scores indicate how many times an image is responsive to a query associated with a person entity.

10. The method of claim 8, wherein the entity ID tag identifies the person entity associated with the image.

11. A method of identifying and ranking one or more images of people entities, the method comprising:
identifying one or more images for a person entity from one or more authoritative URLs having a high confidence factor;
extracting a first set of one or more features from each of the one or more images, wherein the first set of one or more features from each of the one or more images includes absolute rank scores indicating a number of times each image is responsive to a query associated with the person entity;
mining search engine logs to identify queries for the person entity;
utilizing the queries and the first set of one or more features from each of the one or more images to construct candidate queries for the person entity;
issuing the candidate queries against an image index to retrieve candidate image URLs;
extracting a second set of one or more features from each candidate image of the person entity associated with the candidate image URLs;
determining a match based on comparing the first set of one or more features from each of the one or more images of the person entity to the second set of one or more features from each of the candidate image of the person entity;
based on determining the match exists, tagging the each candidate image with an entity ID tag; and
ranking images with the entity ID tag causing a ranking of the candidate image tagged with the entity ID tag to be ranked higher in one or more search engine results page than images without the entity ID tag.

12. The method of claim 11, wherein the first set of one or more features and/or the second set of one or more features further include text similarity features, click features, and visual features.

13. The method of claim 12, wherein visual features include face similarity features.

14. The method of claim 11, further comprising receiving a label associated with a set of training images.

15. The method of claim 14, wherein the label includes varying degrees of match or no match.

16. A computer system that facilitates discovering images of people entities, the computer system comprising a processor coupled to a computer storage medium, the computer storage medium having stored thereon a plurality of computer software components executable by the processor, the computer software components comprising:
a selection component that receives a selection of a person entity;
an entity extraction component that extracts similar entities to the person entity;
a uniform resource locator component that identifies authoritative uniform resource locators (URLs) for the person entity, wherein the authoritative URLs are determined to be trustworthy sources;
an image component that identifies images from the authoritative URLs for the person entity;
an authoritative feature extraction component that extracts a first set of one or more features from the images;
a mine component that mines search engine logs to identify queries for the person entity;
a construct component that utilizes the queries and the first set of one or more features to construct candidate queries for the person entity;
an issue component that issues the candidate queries against a search engine image index to retrieve candidate image URLs;
a candidate feature extraction component that extracts a second set of one or more candidate features from each candidate image from the candidate image URLs, wherein the candidate features include a number of times a candidate URL appears in different queries associated with the person entity;
classifier component determines a match based on comparing the first set of one or more features for the images from each of the one or more images of the person entity to the second set of one or more candidate features from each candidate image of the person entity;
based on determining the match exists, a tag component that tags each candidate image with an entity ID tag, and
a ranking component that ranks images with the entity ID tag causing a ranking of the candidate image tagged with the entity ID tag to be ranked higher in one or more search engine results page than images without the entity ID tag.

17. The system of claim 16, further comprising a training component that trains a classifier with training data associated with the first set of one or more features and/or the second set of one or more features.

18. The system of claim 17, wherein the classifier component runs the classifier on an image index.

19. The system of claim 18, wherein the entity ID tag identifies the person entity associated with the image.

20. The method of claim 1, wherein the match includes varying degrees of the match.

* * * * *